(12) United States Patent
Eto et al.

(10) Patent No.: US 12,273,602 B2
(45) Date of Patent: Apr. 8, 2025

(54) RECEPTION APPARATUS, RECEPTION METHOD, TRANSMISSION APPARATUS, AND TRANSMISSION METHOD

(71) Applicant: Saturn Licensing LLC, New York, NY (US)

(72) Inventors: Hiroaki Eto, Kanagawa (JP); Toshinori Kizukuri, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 105 days.

(21) Appl. No.: 17/611,990

(22) PCT Filed: Jun. 5, 2020

(86) PCT No.: PCT/JP2020/022256
§ 371 (c)(1),
(2) Date: Nov. 17, 2021

(87) PCT Pub. No.: WO2020/250818
PCT Pub. Date: Dec. 17, 2020

(65) Prior Publication Data
US 2022/0256251 A1    Aug. 11, 2022

(30) Foreign Application Priority Data

Jun. 12, 2019 (JP) ................... 2019-109843

(51) Int. Cl.
*H04N 21/84* (2011.01)
*H04N 21/235* (2011.01)
(Continued)

(52) U.S. Cl.
CPC ......... *H04N 21/84* (2013.01); *H04N 21/2353* (2013.01); *H04N 21/435* (2013.01); *H04N 21/4402* (2013.01)

(58) Field of Classification Search
CPC .. H04N 21/84; H04N 21/2353; H04N 21/435; H04N 21/4402
See application file for complete search history.

(56) References Cited

U.S. PATENT DOCUMENTS

2012/0019726 A1* 1/2012 Arora ............... H04N 21/42202
348/602
2013/0314549 A1* 11/2013 Higuchi ................. H04N 17/04
348/175
(Continued)

FOREIGN PATENT DOCUMENTS

CN    102595172 A    7/2012
CN    106454401 A    2/2017
(Continued)

OTHER PUBLICATIONS

International Search Report for PCT/JP2020/022256 dated Jun. 23, 2020, 3 pgs.
(Continued)

*Primary Examiner* — Girumsew Wendmagegn
(74) *Attorney, Agent, or Firm* — Lerner David LLP

(57) ABSTRACT

The appearance of a display image of image content is made appropriate without particular user operation irrespective of viewing environment changes.
A reception unit receives image content. A processing unit performs image quality adjustment processing on the received image content on the basis of metadata for image quality adjustment depending on viewing environment information. For example, the reception unit transmits the viewing environment information to a server and receives the metadata from the server. Further, for example, a metadata generation unit configured to generate the metadata on the basis of the viewing environment information is provided.

18 Claims, 11 Drawing Sheets

(51) Int. Cl.
 *H04N 21/435* (2011.01)
 *H04N 21/4402* (2011.01)

(56) References Cited

U.S. PATENT DOCUMENTS

| | | | |
|---|---|---|---|
| 2017/0238062 A1* | 8/2017 | Oh | H04N 21/6379 725/116 |
| 2022/0198994 A1* | 6/2022 | Yang | G06F 3/005 |

FOREIGN PATENT DOCUMENTS

| | | | |
|---|---|---|---|
| JP | H10108086 | A | 4/1998 |
| JP | 2007025294 | A | 2/2007 |
| JP | 2007057599 | A | 3/2007 |
| JP | 2007318636 | A | 12/2007 |
| JP | 2008035046 | A | 2/2008 |
| JP | 2008225372 | A | 9/2008 |
| JP | 2008225705 | A | 9/2008 |
| JP | 2011250356 | A | 12/2011 |
| JP | 2011259354 | A | 12/2011 |
| JP | 2012049850 | A | 3/2012 |
| JP | 2013243621 | A | 12/2013 |
| JP | 2013251768 | A | 12/2013 |
| JP | 2014003510 | A | 1/2014 |
| JP | 2014120888 | A | 6/2014 |
| JP | 2014523661 | A | 9/2014 |
| WO | 2009118890 | A1 | 10/2009 |
| WO | 2010109900 | A1 | 9/2010 |

OTHER PUBLICATIONS

Search Report dated Dec. 3, 2024 from the Office Action for Chinese Application No. 202080041450.9 Issued Dec. 5, 2024, pp. 1-2.

* cited by examiner

RECEPTION APPARATUS, RECEPTION METHOD, TRANSMISSION APPARATUS, AND TRANSMISSION METHOD

CROSS-REFERENCE TO RELATED APPLICATIONS

This application is a national phase entry under 35 U.S.C. § 371 of International Application No. PCT/JP2020/022256 filed Jun. 5, 2020, which claims the priority from Japanese Patent Application No. 2019-109843 filed in the Japanese Patent Office on Jun. 12, 2019, the entire contents of which are hereby incorporated by reference.

TECHNICAL FIELD

The present technology relates to a reception apparatus, a reception method, a transmission apparatus, and a transmission method.

BACKGROUND ART

For example, PTL 1 discloses a technology of transmitting, from a transmitter to a receiver, together with image content, metadata compatible with the receiving-side display and adjusting the image content on the basis of the metadata in the receiver, to thereby achieve the same appearance of the display image on any display.

CITATION LIST

Patent Literature

[PTL 1]
JP 2014-523661T

SUMMARY

Technical Problem

It is an object of the present technology to make the appearance of a display image of image content appropriate irrespective of viewing environment changes.

Solution to Problem

According to a concept of the present technology, there is provided a reception apparatus including a reception unit configured to receive image content, and a processing unit configured to perform image quality adjustment processing on the received image content on the basis of metadata for image quality adjustment depending on viewing environment information.

In the present technology, the reception unit receives image content. The image content includes movie content. The processing unit performs image quality adjustment processing on the received image content on the basis of metadata for image quality adjustment depending on viewing environment information.

For example, the reception unit may transmit the viewing environment information to a server and receive the metadata from the server. In this case, for example, the viewing environment information may include sensing information and/or display information. Further, in this case, for example, the viewing environment information may include at least any of light brightness information, light color information, wall color information, screen size information, and viewing position information.

Further, in this case, for example, the server may be a server that forms a transmission unit for the image content. Further, in this case, for example, the server may be a server provided separately from a transmission unit (broadcasting station or server) for the image content.

Further, for example, a metadata generation unit configured to generate the metadata on the basis of the viewing environment information may further be included. In this case, for example, the metadata generation unit may generate the metadata by using a metadata generator formed by using a table or a learning result. Then, in this case, for example, the reception unit may receive the table or the learning result from a transmission unit for the image content or a server provided separately from the transmission unit.

Further, for example, a display configured to display an image of the image content subjected to the image quality adjustment processing by the processing unit may further be included. Further, for example, a transmission unit configured to transmit, to a display, the image content subjected to the image quality adjustment processing by the processing unit may further be included.

In this way, in the present technology, image quality adjustment processing is performed on received image content on the basis of metadata for image quality adjustment corresponding to the image content and depending on viewing environment information. Thus, it is possible to make the appearance of a display image of image content be an appropriate appearance such as an appearance intended by the producer, without particular user operation irrespective of viewing environment changes.

Further, according to another concept of the present technology, there is provided a transmission apparatus including a reception unit configured to receive viewing environment information, and a transmission unit configured to transmit image content and metadata for image quality adjustment depending on the viewing environment information.

In the present technology, the reception unit receives viewing environment information. For example, the viewing environment information may include sensing information and/or display information. Further, for example, the viewing environment information may include at least any of light brightness information, light color information, wall color information, screen size information, and viewing position information.

The transmission unit transmits image content and metadata for image quality adjustment depending on viewing environment information. For example, the metadata may be generated on the basis of the viewing environment information by using a metadata generator formed by using a table or a learning result.

In this way, in the present technology, together with image content, metadata for image quality adjustment depending on viewing environment information is transmitted. Thus, through metadata-based image quality adjustment processing on the image content, it is possible to make the appearance of the display image of the image content on the receiver be an appropriate appearance such as an appearance intended by the producer, without particular user operation irrespective of viewing environment changes.

DESCRIPTION OF EMBODIMENTS

Modes for carrying out the invention (hereinafter referred to as "embodiments") will be described below. Note that descriptions thereof will be given in the following order.
1. First Embodiment
2. Second Embodiment
3. Third Embodiment
4. Fourth Embodiment
5. Fifth Embodiment
6. Sixth Embodiment
7. Modified Example

1. First Embodiment

[Content Distribution System]

Figure 1:
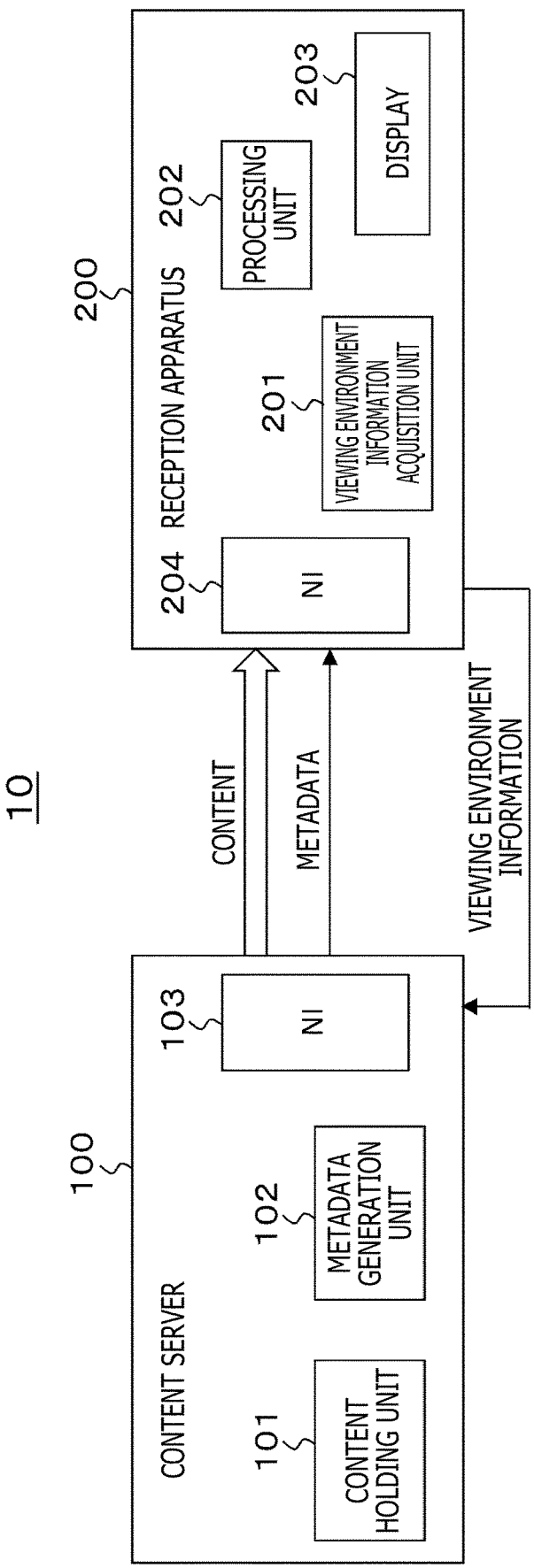
FIG. 1 is a block diagram illustrating a configuration example of a content distribution system of a first embodiment.

FIG. 1 illustrates a configuration example of a content distribution system 10 of a first embodiment. The content distribution system 10 includes a content server 100 as a transmitter and a reception apparatus 200 as a receiver. The content server 100 and the reception apparatus 200 are connected to each other via a network such as the Internet.

The content server 100 holds a predetermined amount of image content in a content holding unit 101. The image content held in the content holding unit 101 in this way has been subjected to encoding processing. Here, the image content is, for example, movie content but is not limited thereto.

The reception apparatus 200 sends viewing environment information acquired by a viewing environment information acquisition unit 201 to the content server 100 via a network interface 204. The viewing environment information is information indicating in what kind of environment the user is watching an image displayed on the display, and includes a predetermined number of parameters. The viewing environment information includes, for example, sensing information and/or display information. The sensing information is information that is acquired by using a sensor device. The display information is information that corresponds to a display 203 of the reception apparatus 200 and is held in the memory or the like in advance.

The viewing environment information includes, for example, at least any of light brightness information, light color information, wall color information, screen size information, and viewing position information. Here, the wall color information can be obtained by analyzing a wall image captured by, for example, the image sensor (camera) of the reception apparatus 200 or the image sensor of, for example, a smartphone of the user. Alternatively, it is also conceivable that the wall color information is given through an input operation by the user. In this case, in consideration of user convenience, it is also conceivable that various colors are displayed on the screen of the display 203 to allow the user to select the same color as the wall color from the various colors.

The content server 100 extracts predetermined image content from the content holding unit 101 and transmits, as streaming data, the image content to the reception apparatus 200 via a network interface 103. The predetermined image content is content requested by the reception apparatus 200 to be transmitted, for example. When sending the predetermined image content to the reception apparatus 200, the content server 100 generates, by a metadata generation unit 102, metadata for image quality adjustment depending on viewing environment information.

The content server 100 receives, by the network interface 103, viewing environment information sent from the reception apparatus 200. The content server 100 generates, by the metadata generation unit 102, metadata for image quality adjustment on the basis of the above-mentioned viewing environment information by using a metadata generator formed by using a table or a learning result. The content server 100 also sends the metadata to the reception apparatus 200 when transmitting the predetermined image data to the reception apparatus 200 as described above. The metadata changes depending on changes in sensing information.

The metadata generation unit 102 can generate metadata irrespective of image content extracted from the content holding unit 101, and it is also conceivable that the metadata generation unit 102 generates different types of metadata depending on image content. In this case, the metadata is generated by using a table or learning result depending on the image content.

The metadata is used by the reception apparatus 200 to perform, on image content, image quality adjustment processing in terms of screen brightness, screen color temperature, contrast, saturation, gamma, or the like. The reception apparatus 200 has, as a default adjustment value, an adjustment value that achieves the optimum appearance of a display image in pitch-black darkness such as in a movie theater. The metadata is used for making the appearance of a display image in the current viewing environment be an appearance in pitch-black darkness such as in a movie theater, and is an offset value from the default adjustment value, for example.

Figure 2:
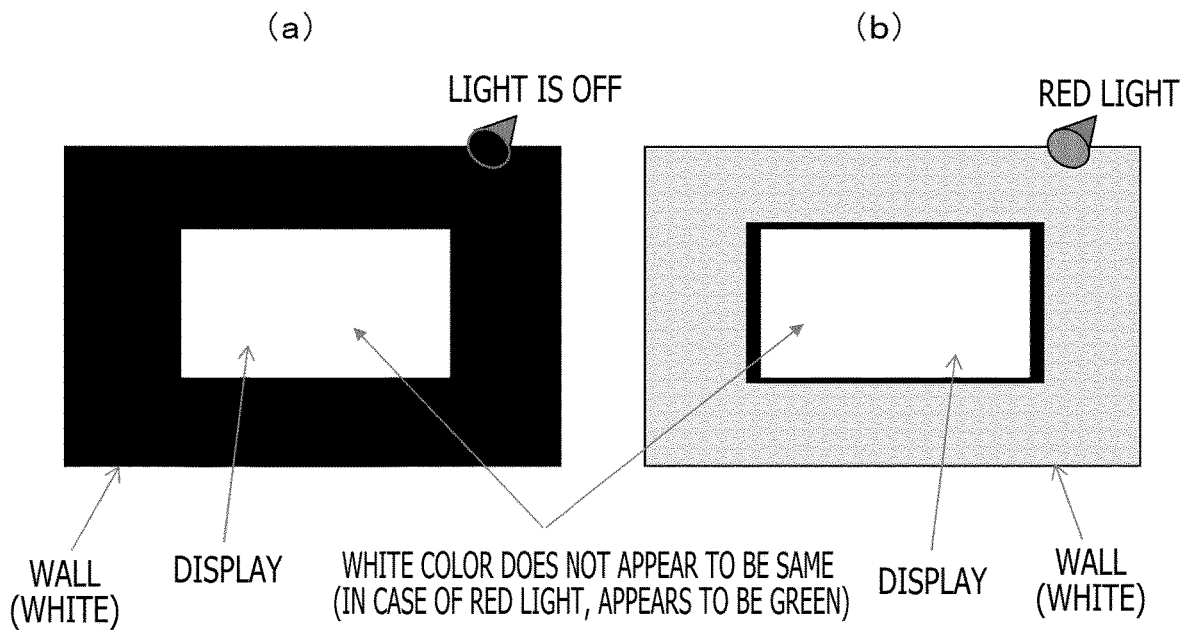
FIG. 2 illustrates diagrams for describing a concrete example of metadata.

Here, (a) of FIG. 2 illustrates an example in which the light is off, and (b) of FIG. 2 illustrates an example in which the red light is on. In this case, the red light makes the color of the wall near the display look different from that in the state in which the light is off, so that, due to the contrast effect, a white color on the display screen appears to gain the opposite color of the light, that is, appears to be green.

Figure 3:
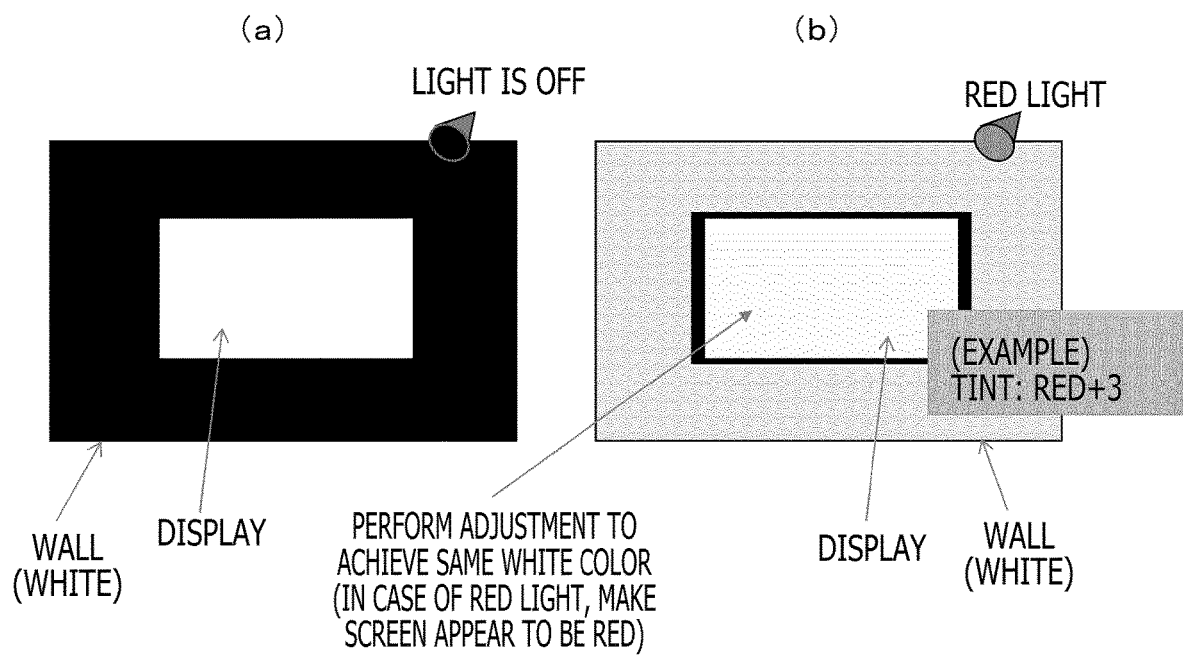
FIG. 3 illustrates diagrams for describing a concrete example of metadata.

In this case, as illustrated in (b) of FIG. 3, an adjustment value (offset value) for "tint: red" of metadata is set to "+3," for example, to adjust the display screen to appear to be red, thereby making the white color on the display screen look the same white color as that in the state in which the light is off in (a) of FIG. 2. Note that (a) of FIG. 3 illustrates the state in which the light is off, similarly to the case in (a) of FIG. 2.

Figure 4:
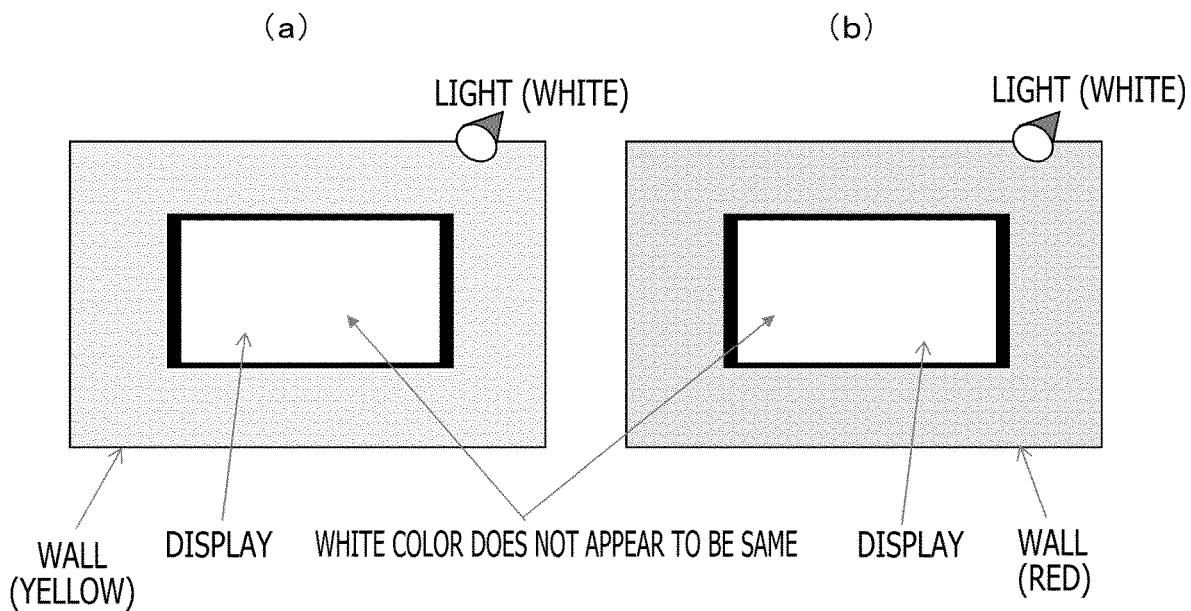
FIG. 4 illustrates diagrams for describing a concrete example of metadata.

Here, (a) of FIG. 4 illustrates an example in which the light (white) is on and the wall color is yellow, and (b) of FIG. 4 illustrates an example in which the light (white) is on and the wall color is red. Also in each case, the color of the wall near the display looks different from that in the state in which the light is off, so that, due to the contrast effect, the white color on the display screen appears to gain the opposite color of the light, that is, appears to be green. Here, the white color appears to be greener on the red wall than on the yellow wall.

Figure 5:
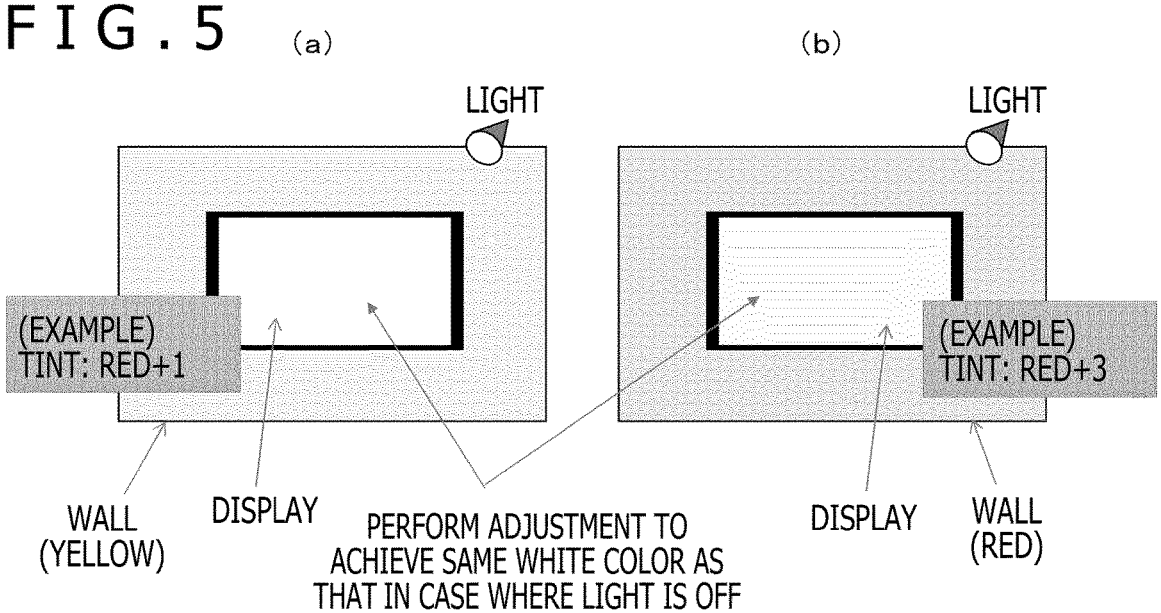
FIG. 5 illustrates diagrams for describing a concrete example of metadata.

In a case where the wall color is yellow, as illustrated in (a) of FIG. 5, an adjustment value (offset value) for "tint: red" of metadata is set to "+1," for example, to adjust the display screen to appear to be slightly red, thereby making the white color on the display screen look the same white color as that in the state in which the light is off in (a) of FIG. 2. Further, in a case where the wall color is red, as illustrated in (b) of FIG. 5, an adjustment value (offset value) for "tint: red" of metadata is set to "+3," for example, to adjust the display screen to appear to be red, thereby making the white color on the display screen look the same white color as that in the state in which the light is off in (a) of FIG. 2.

Figure 6:
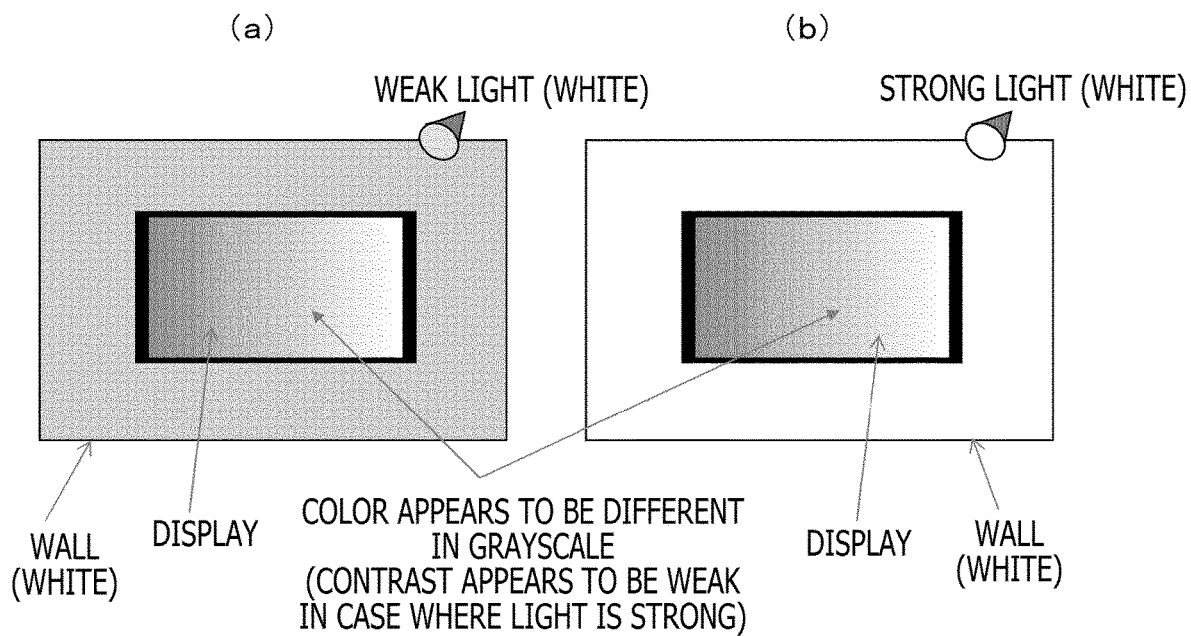
FIG. 6 illustrates diagrams for describing a concrete example of metadata.

Here, (a) of FIG. 6 illustrates an example in which the weak light (white) is on, and (b) of FIG. 6 illustrates an example in which the strong light (white) is on. In such cases, the brightness of the wall near the display differs according to the light intensity of the light, so that the appearance of the contrast on the display screen looks different.

Figure 7:
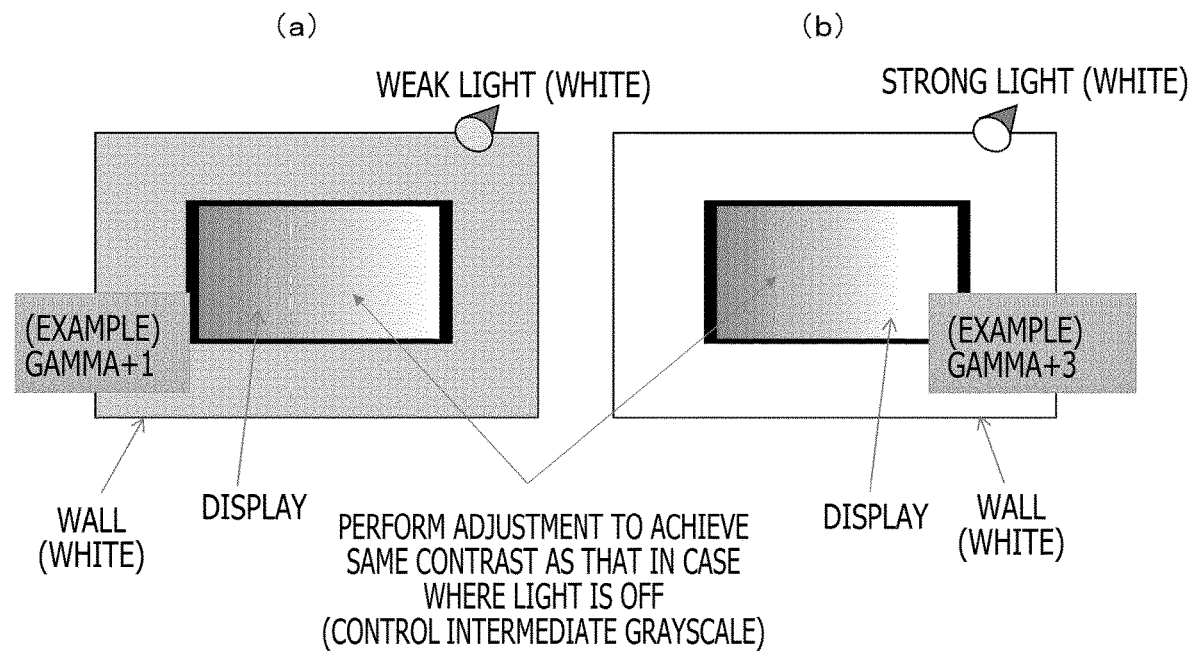
FIG. 7 illustrates diagrams for describing a concrete example of metadata.

In a case where the light is weak, as illustrated in (a) of FIG. 7, an adjustment value (offset value) for "gamma" of metadata is set to "+1," for example, to adjust the contrast on the display screen to be slightly strong, thereby making the white color on the display screen appear to have the same contrast as that in the state in which the light is off in (a) of FIG. 2. Further, in a case where the light is strong, as illustrated in (b) of FIG. 7, an adjustment value (offset value) for "gamma" of metadata is set to "+3," for example, to adjust the contrast on the display screen to be strong, thereby making the white color on the display screen appear to have the same contrast as that in the state in which the light is off in (a) of FIG. 2.

Referring back to FIG. 1, the reception apparatus 200 receives, by the network interface 204, the image content and the metadata for image quality adjustment sent from the content server 100. The reception apparatus 200 performs, by a processing unit 202, image quality adjustment processing on the image content sent from the content server 100, on the basis of the metadata for image quality adjustment sent together with the image content. Then, the reception apparatus 200 displays, on the display 203, the image of the image content subjected to the image quality adjustment processing. Through the adjustment, the display image has the same appearance as an appearance in pitch-black darkness such as in a movie theater irrespective of viewing environment changes.

Note that it is also conceivable that metadata is not an offset value from the default adjustment value but an absolute value.

"Content Server"

Figure 8:
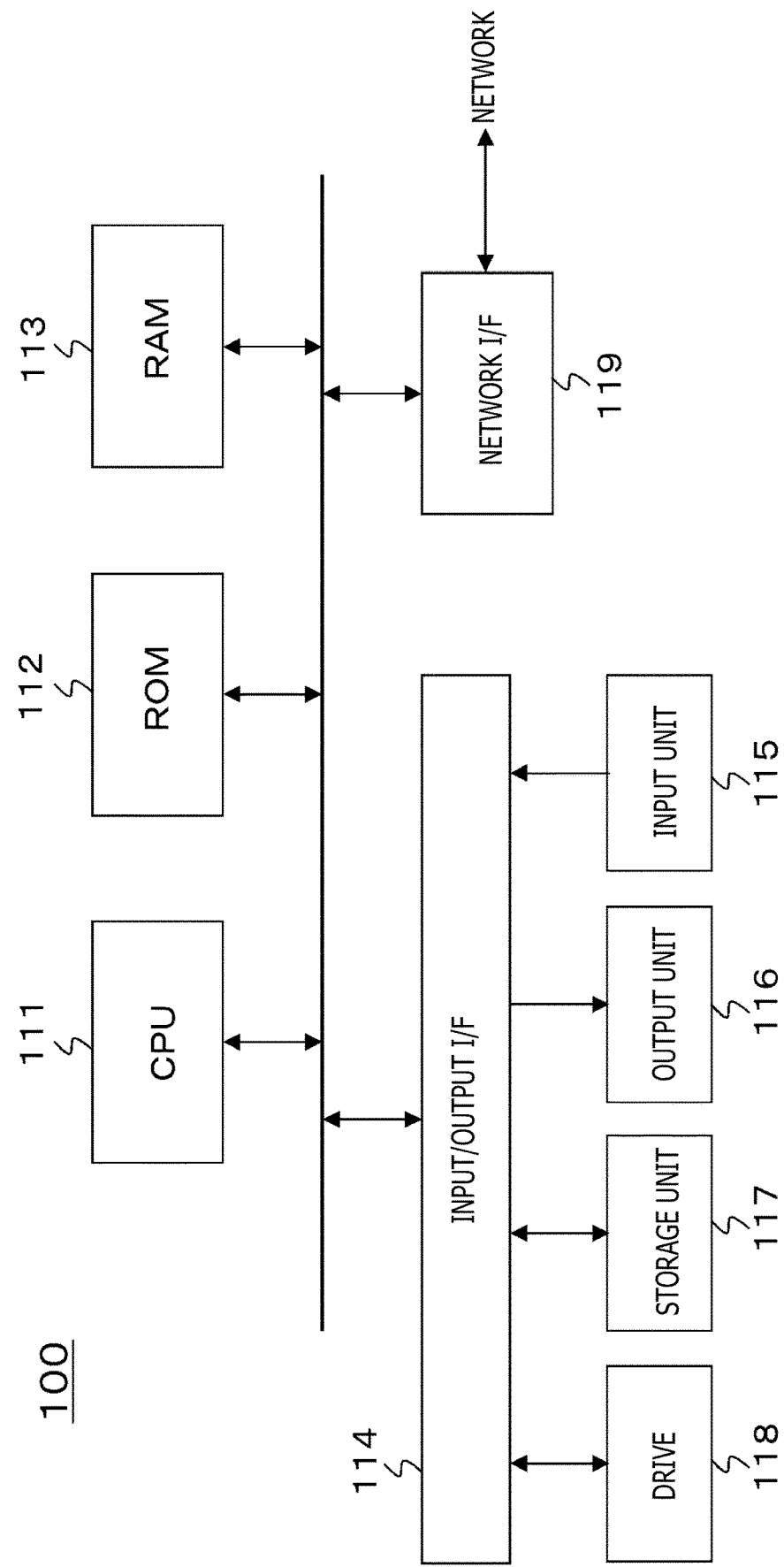
FIG. 8 is a block diagram illustrating a configuration example of a content server.

FIG. 8 illustrates a configuration example of the content server 100. The content server 100 includes a CPU 111, a ROM 112, a RAM 113, an input/output interface 114, an input unit 115, an output unit 116, a storage unit 117, a drive 118, and a network interface 119.

In the content server 100, the CPU 111, the ROM 112, and the RAM 113 are connected to each other via a bus. The input/output interface 114 is also connected to the bus. The input unit 115, the output unit 116, the storage unit 117, and the drive 118 are connected to the input/output interface 114. The CPU 111 controls the operation of each unit of the content server 100.

The input unit 115 includes a keyboard, a mouse, a microphone, or the like. The output unit 116 includes a display, a speaker, or the like. The storage unit 117 includes an HDD (Hard Disk Drive), a nonvolatile memory, or the like. For example, the storage unit 117 forms the content holding unit 101 (see FIG. 1) configured to hold the predetermined amount of image content. The drive 118 drives a removable medium such as a magnetic disk, an optical disc, a magneto-optical disk, or a memory card.

Further, the network interface 119 is connected to the bus. The network interface 119 communicates with the reception apparatus 200 via a network such as the Internet. In the embodiment, the network interface 119 fragments image content extracted from the storage unit 117, to generate IP packets as transmission packets, and transmits the IP packets to the reception apparatus 200.

Further, the network interface 119 receives viewing environment information sent from the reception apparatus 200 and sends the viewing environment information to the CPU 111. The CPU 111 generates metadata for image quality adjustment on the basis of the viewing environment information by using a metadata generator formed by using a table or a learning result. In this regard, the CPU 111 forms the metadata generation unit 102 (see FIG. 1).

The network interface 119 generates IP packets including metadata for image quality adjustment generated by the CPU 111 and sends the IP packets to the reception apparatus 200. Note that it is also conceivable that metadata is inserted into, for example, the header area of an IP packet including image content in its payload and is then transmitted.

"Reception Apparatus"

Figure 9:
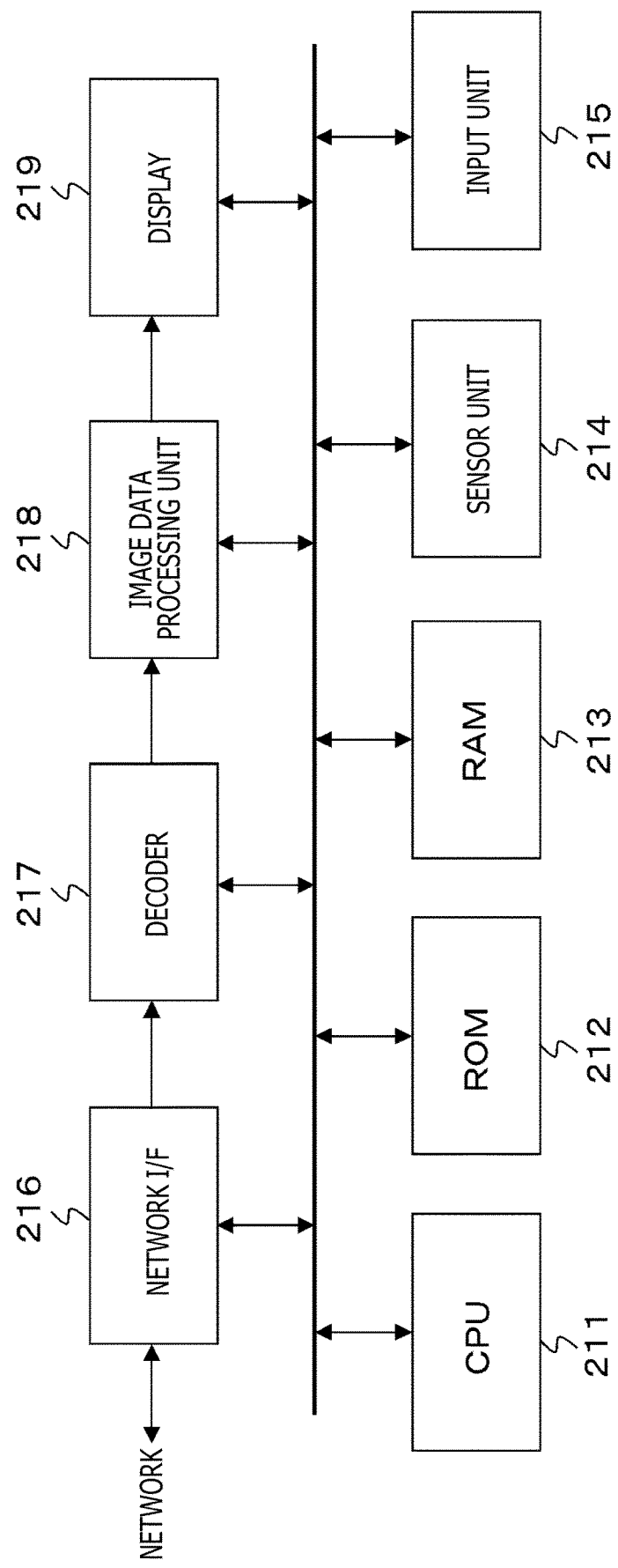
FIG. 9 is a block diagram illustrating a configuration example of a reception apparatus.

FIG. 9 illustrates a configuration example of the reception apparatus 200. The reception apparatus 200 includes a CPU 211, a ROM 212, a RAM 213, a sensor unit 214, an input unit 215, a network interface 216, a decoder 217, an image data processing unit 218, and a display 219. Note that, in this example, the illustration of the sound system is omitted for the sake of simple description.

In the reception apparatus 200, the CPU 211, the ROM 212, and the RAM 213 are connected to each other via a bus. The sensor unit 214, the input unit 215, the network interface 216, the decoder 217, the image data processing unit 218, and the display 219 are also connected to the bus. The CPU 211 controls the operation of each unit of the reception apparatus 200.

The input unit 215 includes a physical button, a touch panel, a remote controller, or the like for allowing the user to perform various types of operation. The sensor unit 214 includes a sensor group for obtaining sensing information included in viewing environment information. For example, the sensor unit 214 includes a sensor for obtaining light brightness or color information, a sensor for obtaining wall color information, or a sensor for obtaining user viewing position information.

The CPU 211 acquires viewing environment information on the basis of sensing information from the sensor unit 214 and display information (including screen size information or the like) stored in the ROM 212, for example. In this regard, the CPU 211 forms the viewing environment information acquisition unit 201 (see FIG.

The network interface 216 communicates with the content server 100 via a network such as the Internet. In the embodiment, the network interface 216 transmits, to the content server 100, viewing environment information acquired by the CPU 211 as described above. Further, the network interface 216 receives IP packets sent from the content server 100 and supplies the IP packets to the decoder 217.

The decoder 217 performs, on IP packets, depacketization processing and decoding processing as needed to acquire the decoded image content (image data) and the metadata for image quality adjustment. The metadata is sent to the CPU 211. The image content is supplied to the image data processing unit 218.

The image data processing unit 218 performs, under the control of the CPU 211, image quality adjustment processing in terms of screen brightness, screen color temperature, contrast, saturation, gamma, or the like on the basis of metadata for image quality adjustment acquired by the decoder 217 as described above. In this regard, the image data processing unit 218 forms the processing unit 218 (see FIG. 1).

The display 219 includes, for example, a liquid crystal panel or an organic EL panel and forms a display unit. The display 219 receives image content subjected to image quality adjustment processing by the image data processing unit 218 and displays the image of the image content.

As described above, in the content distribution system 10 illustrated in FIG. 1, the content server 100 transmits, together with image content, metadata for image quality adjustment depending on viewing environment information to the reception apparatus 200, and the reception apparatus 200 transmits viewing environment information to the content server 100 and performs image quality adjustment processing on the image content sent from the content server 100 on the basis of the metadata for image quality adjustment sent together with the image content. Thus, it is possible to make the appearance of a display image of image content on the receiver be an appropriate appearance such as an appearance intended by the producer, without particular user operation irrespective of viewing environment changes.

Further, in the content distribution system 10 illustrated in FIG. 1, viewing environment information is transmitted from the reception apparatus 200 to the content server 100, and the content server 100 generates metadata for image quality adjustment on the basis of the viewing environment information and transmits the metadata to the reception apparatus 200. Thus, the content server 100 can change the metadata on a real time basis in a case where the content server 100 transmits a news flash instead of image content, for example. Further, an increase in number of parameters of viewing environment information sent from the reception apparatus 200 can be handled. For example, the content server 100 can handle a case where the reception apparatus 200 acquires an additional parameter by an additionally mounted sensor. Further, it may be possible to replace metadata used in the first image content distribution with metadata higher in quality, in some cases. In addition, since the processing capability of the content server 100 is high, more appropriate metadata can be generated by advanced processing.

2. Second Embodiment

[Content Distribution System]

Figure 10:
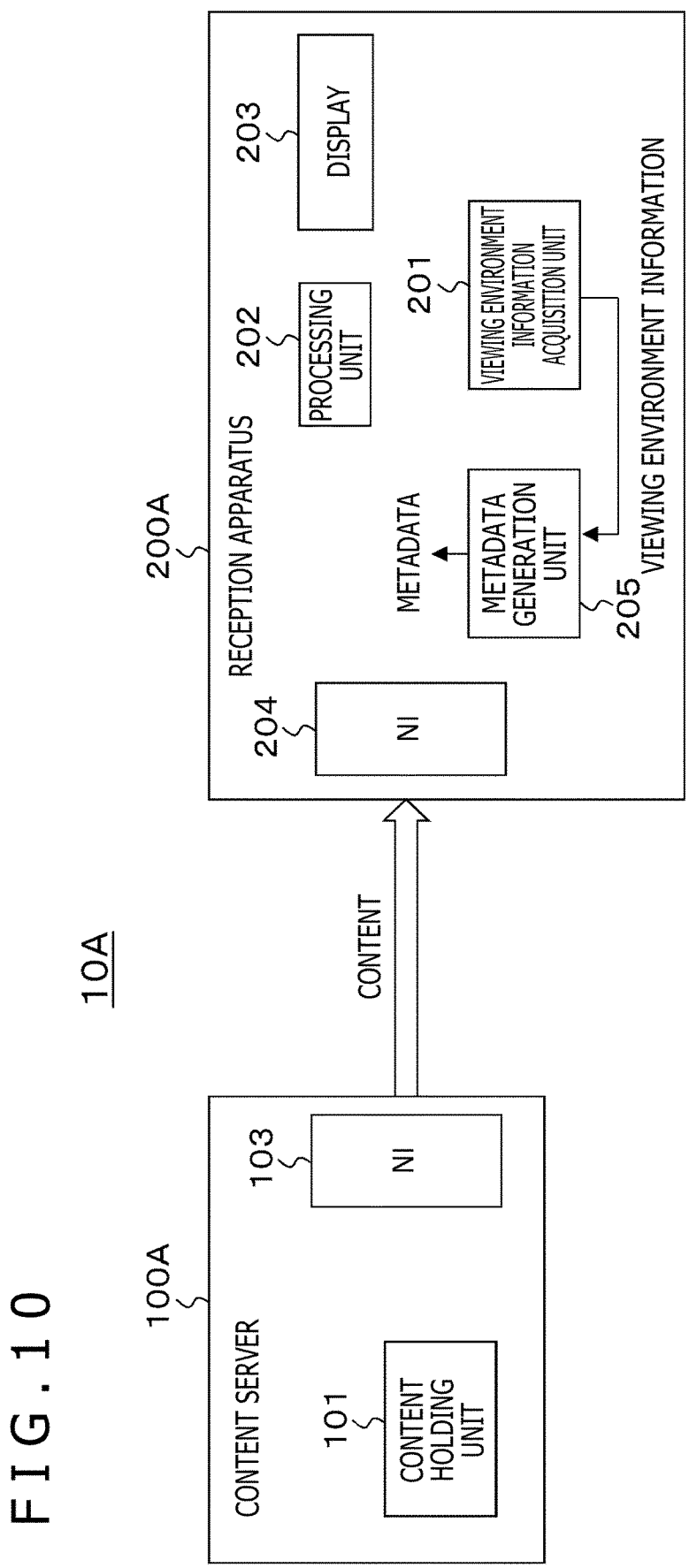
FIG. 10 is a block diagram illustrating a configuration example of a content distribution system of a second embodiment.

FIG. 10 illustrates a configuration example of a content distribution system 10A of a second embodiment. In FIG. 10, parts corresponding to those in FIG. 1 are denoted by the same reference signs, and the detailed description thereof is appropriately omitted.

The content distribution system 10A includes a content server 100A as a transmitter and a reception apparatus 200A as a receiver. The content server 100A and the reception apparatus 200A are connected to each other via a network such as the Internet. Note that the content server 100A and the reception apparatus 200A are configured similarly to the content server 100 (see FIG. 8) and the reception apparatus 200 (see FIG. 9) in FIG. 1, and hence, the description of the detailed configurations thereof is omitted.

The content server 100A holds a predetermined amount of image content in the content holding unit 101. The image content held in the content holding unit 101 in this way has been subjected to encoding processing. The content server 100A extracts predetermined image content from the content holding unit 101 and transmits, as streaming data, the image content to the reception apparatus 200A via the network interface 103.

The reception apparatus 200A generates, by a metadata generation unit 205, metadata for image quality adjustment on the basis of viewing environment information acquired by the viewing environment information acquisition unit 201, by using a metadata generator formed by using a table or a learning result. This metadata is similar to the metadata that is generated by the metadata generation unit 102 in the content server 100 in FIG. 1. In this case, the table or learning result that is used by the metadata generation unit 205 may be transmitted from the content server 100 in advance before the transmission of image content, for example.

The reception apparatus 200A receives, by the network interface 204, the image content sent from the content server 100. The reception apparatus 200A performs, by the processing unit 202, image quality adjustment processing on the basis of the metadata for image quality adjustment generated by the metadata generation unit 205. Then, the reception apparatus 200A displays, on the display 203, the image of the image content subjected to the image quality adjustment processing. Through the adjustment, the display image has the same appearance as an appearance in pitch-black darkness such as in a movie theater irrespective of viewing environment changes.

As described above, in the content distribution system 10A illustrated in FIG. 10, the reception apparatus 200A generates metadata for image quality adjustment depending on viewing environment information and performs image quality adjustment processing on image content sent from the content server 100A, on the basis of the generated metadata for image quality adjustment. Thus, it is possible to make the appearance of a display image of image content on the receiver be an appropriate appearance such as an appearance intended by the producer, without particular user operation irrespective of viewing environment changes.

3. Third Embodiment

[Content Distribution System]

Figure 11:
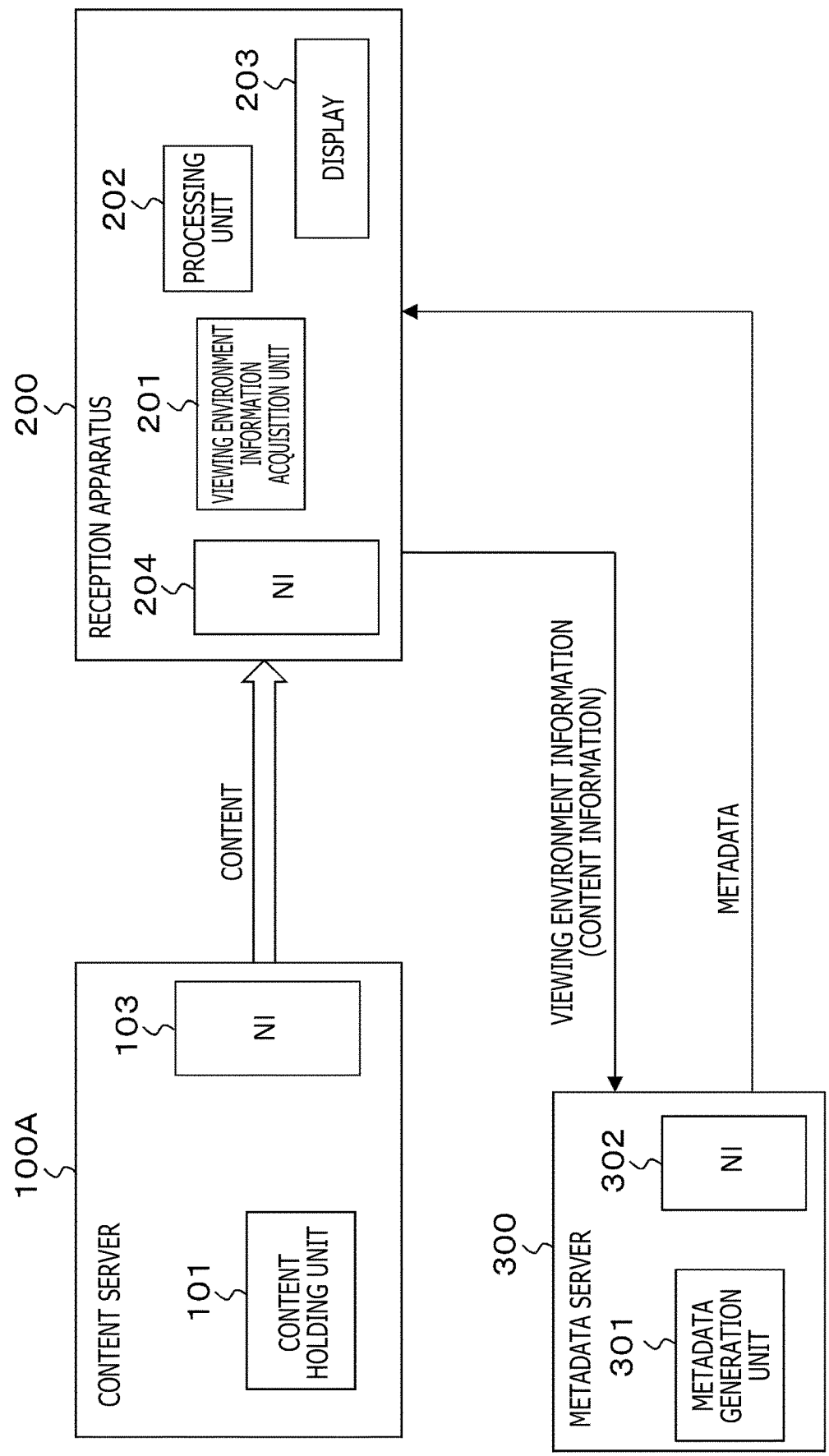
FIG. 11 is a block diagram illustrating a configuration example of a content distribution system of a third embodiment.

FIG. 11 illustrates a configuration example of a content distribution system 10B of a third embodiment. In FIG. 11, parts corresponding to those in FIG. 1 or FIG. 10 are denoted by the same reference signs, and the detailed description thereof is appropriately omitted.

The content distribution system 10B includes the content server 100A and a metadata server 300 as transmitters, and the reception apparatus 200 as a receiver. The reception apparatus 200A is connected to the content server 100A and the metadata server 300 via a network such as the Internet.

The content server 100A holds a predetermined amount of image content in the content holding unit 101. The image content held in the content holding unit 101 in this way has been subjected to encoding processing. The content server 100A extracts predetermined image content from the content holding unit 101 and transmits, as streaming data, the image content to the reception apparatus 200 via the network interface 103.

The reception apparatus 200 sends viewing environment information acquired by the viewing environment information acquisition unit 201 to the metadata server 300 via the network interface 204. The metadata server 300 receives, by a network interface 302, the viewing environment information sent from the reception apparatus 200. The metadata server 300 generates, by a metadata generation unit 301, metadata for image quality adjustment on the basis of the above-mentioned viewing environment information by using a metadata generator formed by using a table or a learning result. This metadata is similar to the metadata that is generated by the metadata generation unit 102 in the content server 100 in FIG. 1. The metadata server 300 sends the metadata to the reception apparatus 200 via the network interface 302.

The metadata generation unit 301 can generate metadata irrespective of image content extracted from the content holding unit 101, and it is also conceivable that the metadata generation unit 301 generates different types of metadata depending on image content. In this case, in addition to viewing environment information, content information specifying image content to be received is also sent from the reception apparatus 200 to the metadata server 300 via the network interface 204.

The reception apparatus 200 receives, by the network interface 204, the image content sent from the content server 100A and the metadata for image quality adjustment sent from the metadata server 300. The reception apparatus 200 performs, by the processing unit 202, image quality adjustment processing on the image content sent from the content server 100A, on the basis of the metadata for image quality adjustment sent from the metadata server 300. Then, the reception apparatus 200 displays, on the display 203, the image of the image content subjected to the image quality adjustment processing. Through the adjustment, the display image has the same appearance as an appearance in pitch-black darkness such as in a movie theater irrespective of viewing environment changes.

As described above, in the content distribution system 10B illustrated in FIG. 11, the reception apparatus 200 transmits viewing environment information to the metadata server 300 and performs image quality adjustment processing on image content sent from the content server 100A, on the basis of metadata for image quality adjustment sent from the metadata server 300. Thus, it is possible to make the appearance of a display image of image content on the receiver be an appropriate appearance such as an appearance intended by the producer, without particular user operation irrespective of viewing environment changes.

Further, in the content distribution system 10B illustrated in FIG. 11, viewing environment information is transmitted from the reception apparatus 200 to the metadata server 300, and the metadata server 300 generates metadata for image quality adjustment on the basis of the viewing environment information and transmits the metadata to the reception apparatus 200. Thus, the metadata can be changed on a real time basis in a case where a news flash is transmitted from the content server 100A instead of image content, for example. Note that, in this case, the content server 100A and the metadata server 300 need to operate in cooperation with each other. Further, an increase in number of parameters of viewing environment information sent from the reception apparatus 200 can be handled. For example, the metadata server 300 can handle a case where the reception apparatus 200 acquires an additional parameter by an additionally mounted sensor. Further, it may be possible to replace metadata used in the first image content distribution with metadata higher in quality, in some cases. In addition, since the processing capability of the metadata server 300 is high, more appropriate metadata can be generated by advanced processing.

4. Fourth Embodiment

[Content Distribution System]

Figure 12:
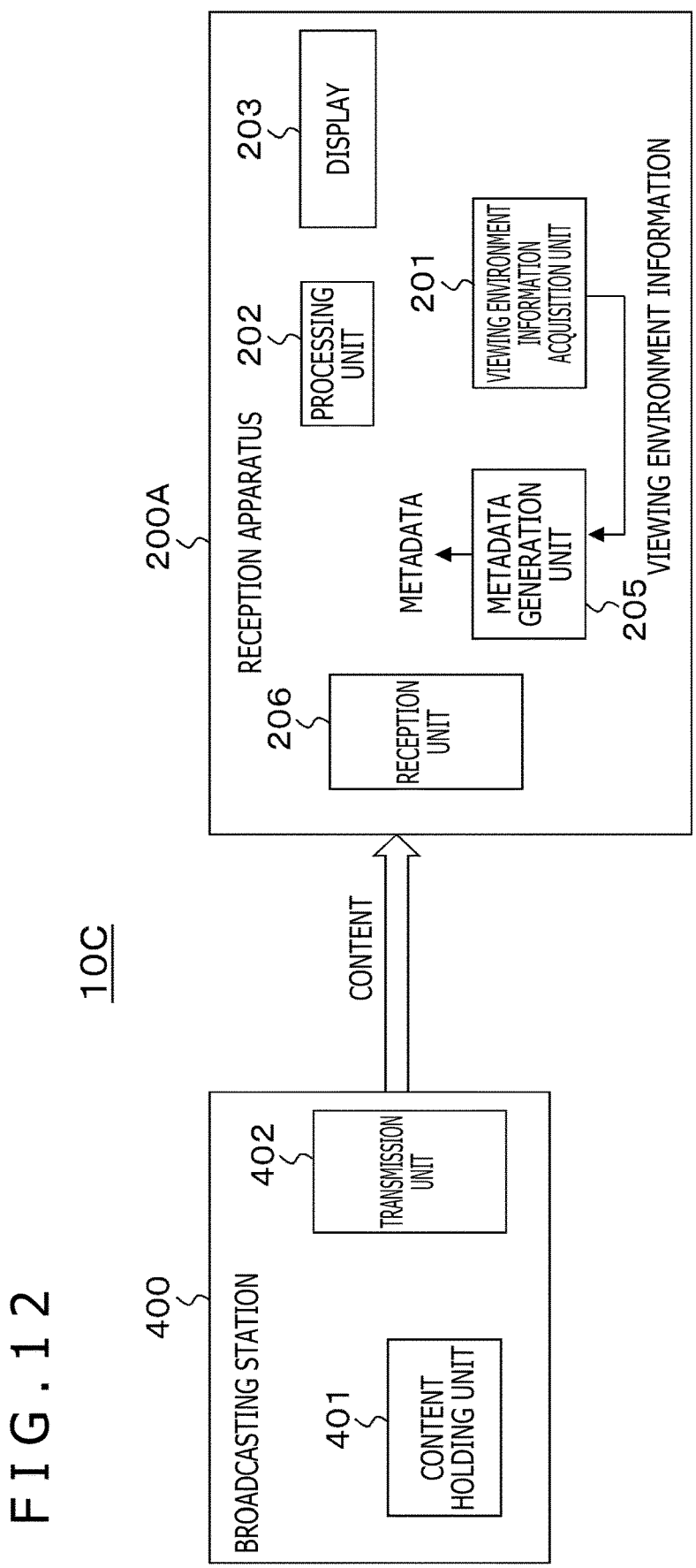
FIG. 12 is a block diagram illustrating a configuration example of a content distribution system of a fourth embodiment.

FIG. 12 illustrates a configuration example of a content distribution system 10C of a fourth embodiment. In FIG. 12, parts corresponding to those in FIG. 10 are denoted by the same reference signs, and the detailed description thereof is appropriately omitted.

The content distribution system 10C includes a broadcasting station 400 as a transmitter and the reception apparatus 200A as a receiver. The broadcasting station 400 holds a predetermined amount of image content in a content holding unit 401. The image content held in the content holding unit 401 in this way has been subjected to encoding processing.

The broadcasting station 400 extracts predetermined image content from the content holding unit 401 and transmits the image content from a transmission unit 402 to the reception apparatus 200A via a broadcast transmission line. In this case, the broadcasting station 400 generates, for example, IP packets each including a fragmented portion of the image content and encapsulates the IP packets to generate TLV packets. The broadcasting station 400 transmits a transmission stream having the sequentially arranged TLV packets to the receiver by a broadcast wave through an RF transmission line. The reception apparatus 200A receives, by a reception unit 206, the image content sent from the broadcasting station 400.

The remaining configuration of the content distribution system 100, the detailed description of which is omitted, is similar to that of the content distribution system 10A in FIG. 10. The content distribution system 100 can obtain effects similar to those of the content distribution system 10A.

5. Fifth Embodiment

[Content Distribution System]

Figure 13:
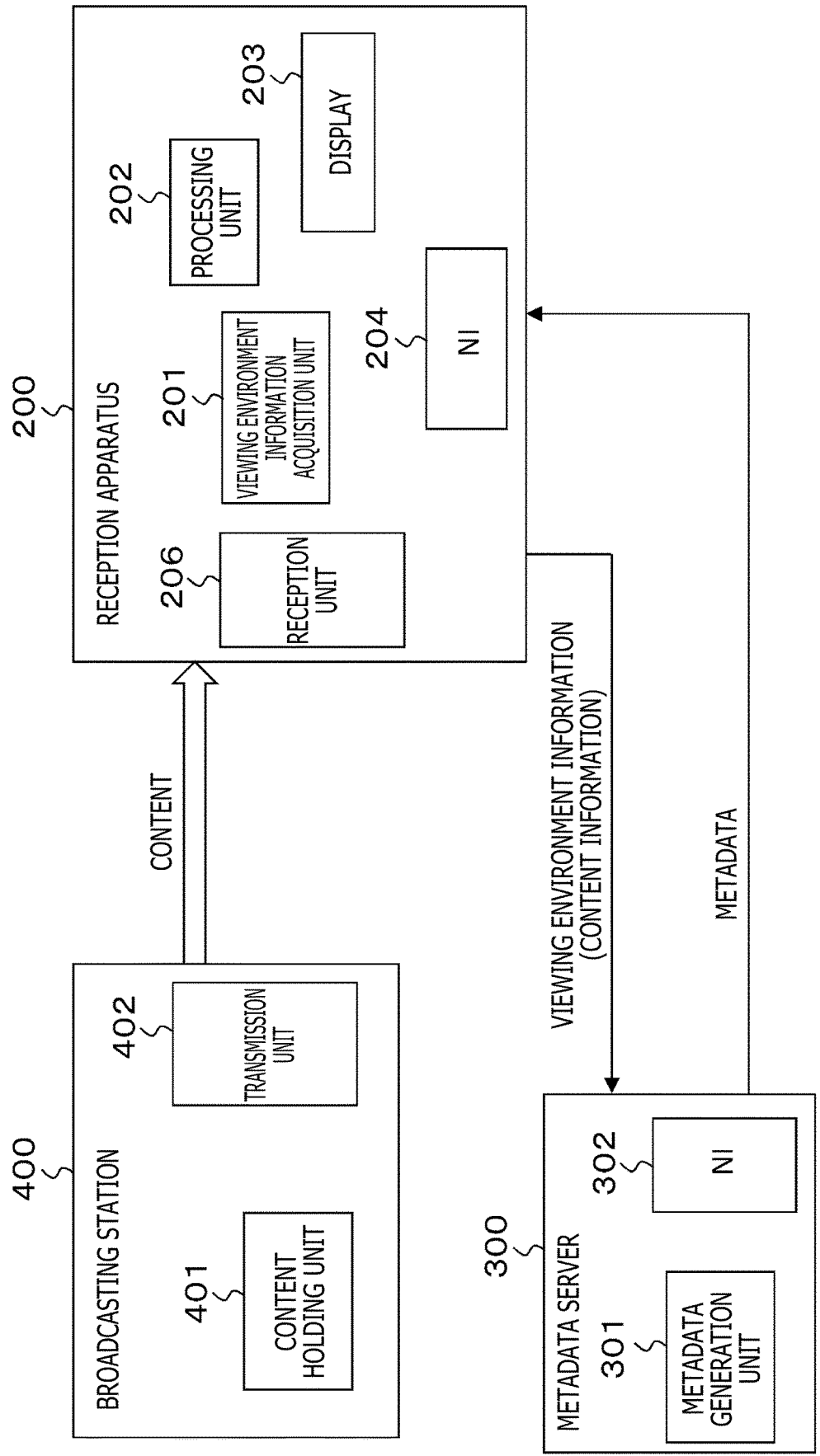
FIG. 13 is a block diagram illustrating a configuration example of a content distribution system of a fifth embodiment.

FIG. 13 illustrates a configuration example of a content distribution system 10D of a fifth embodiment. In FIG. 13, parts corresponding to those in FIG. 11 or FIG. 12 are denoted by the same reference signs, and the detailed description thereof is appropriately omitted.

The content distribution system 10D includes the broadcasting station 400 and the metadata server 300 as transmitters, and the reception apparatus 200 as a receiver. The broadcasting station 400 extracts predetermined image content from the content holding unit 401 and transmits the image content from the transmission unit 402 to the reception apparatus 200 via a broadcast transmission line. The reception apparatus 200 receives, by the reception unit 206, the image content sent from the broadcasting station 400.

The remaining configuration of the content distribution system 10D, the detailed description of which is omitted, is similar to that of the content distribution system 10B in FIG. 11. The content distribution system 10D can obtain effects similar to those of the content distribution system 10B.

6. Sixth Embodiment

[Content Distribution System]

Figure 14:
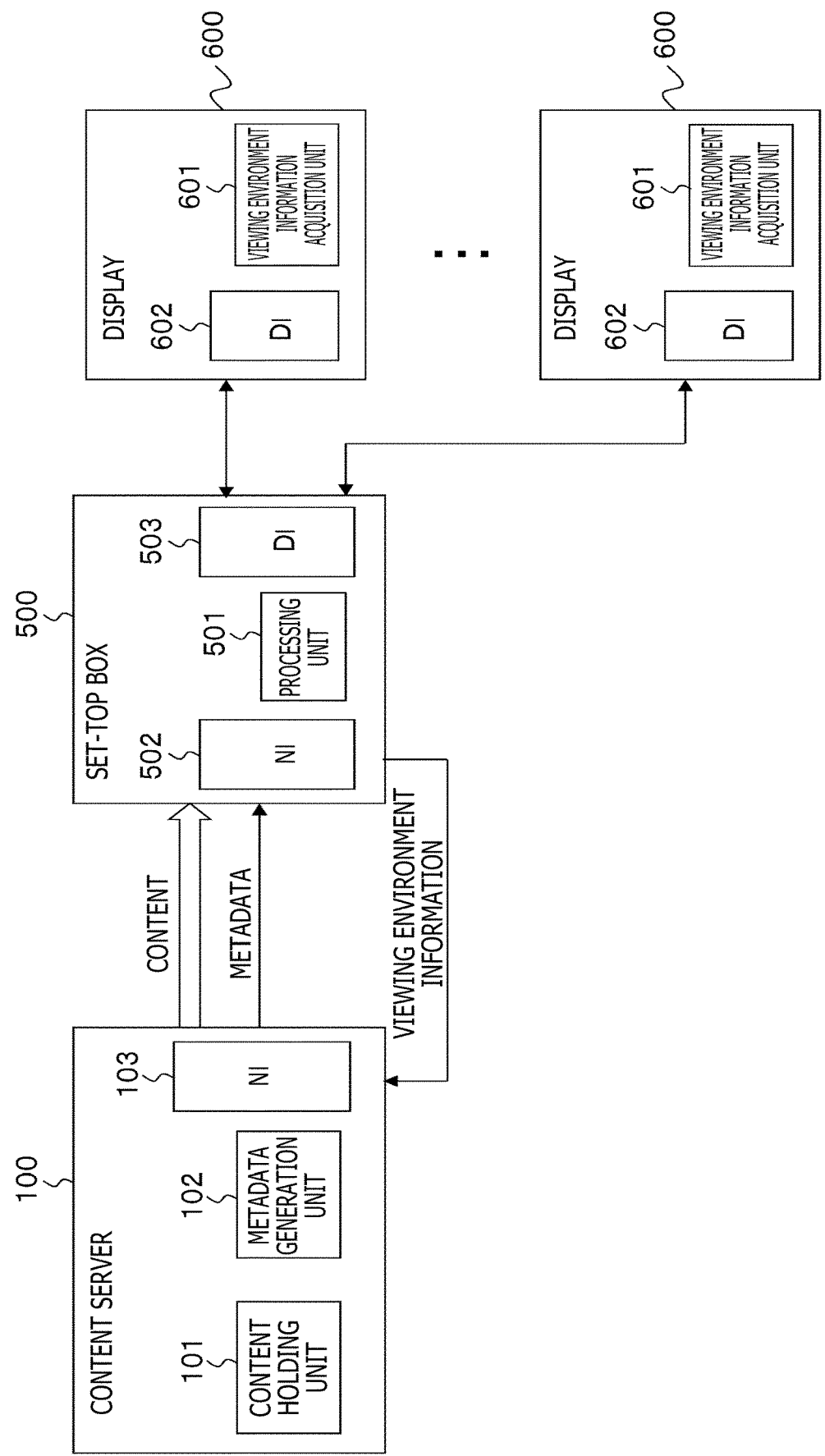
FIG. 14 is a block diagram illustrating a configuration example of a content distribution system of a sixth embodiment.

FIG. 14 illustrates a configuration example of a content distribution system 10E of a sixth embodiment. In FIG. 14, parts corresponding to those in FIG. 1 are denoted by the same reference signs, and the detailed description thereof is appropriately omitted.

The content distribution system 10E includes the content server 100 as a transmitter, and a set-top box 500 and a predetermined number of displays 600 as receivers. The content server 100 and the set-top box 500 are connected to each other via a network such as the Internet. Further, the set-top box 500 and the display 600 are connected to each other via a digital interface such as an HDMI. Note that the set-top box 500 and the display 600 may be connected to each other wirelessly instead of with a cable.

The display 600 acquires viewing environment information by a viewing environment information acquisition unit 601. Any of the predetermined number of displays 600 is selectively connected to the set-top box 500. Viewing environment information acquired by the viewing environment information acquisition unit 201 of the display 600 connected to the set-top box 500 is sent to the set-top box 500 via a digital interface 602. Then, the set-top box 500 receives the viewing environment information by a digital interface 503 and sends the viewing environment information to the content server 100 via a network interface 502.

Note that, in the example illustrated in FIG. 14, the display 600 includes the viewing environment information acquisition unit 601, but the set-top box 500 may include the viewing environment information acquisition unit 601. In this case, sensing information or display information is sent from the display 600 to the set-top box 500 via the digital interface 602, and the set-top box 500 acquires viewing environment information on the basis of these pieces of information.

The content server 100 extracts predetermined image content from the content holding unit 101 and transmits, as streaming data, the image content to the set-top box 500 via the network interface 103. Further, the content server 100 sends metadata for image quality adjustment generated by the metadata generation unit 102 to the set-top box 500 via the network interface 103.

The set-top box 500 receives, by the network interface 502, the image content and metadata for image quality adjustment sent from the content server 100. The set-top box 500 performs, by a processing unit 501, image quality adjustment processing on the image content sent from the content server 100, on the basis of the metadata for image quality adjustment sent together with the image content. Then, the set-top box 500 transmits the image content subjected to the image quality adjustment processing to the connected display 600 via the digital interface 503. The display 600 receives the image content sent from the set-top box 500, by the digital interface 602. Then, the display 600 displays the image of the image content. Through the adjustment, the display image has the same appearance as an appearance in pitch-black darkness such as in a movie theater irrespective of viewing environment changes.

As described above, in the content distribution system 10E illustrated in FIG. 14, the content server 100 transmits, together with image content, metadata for image quality adjustment depending on viewing environment information to the set-top box 500, and the set-top box 500 transmits viewing environment information regarding the connected display 600 to the content server 100 and performs image quality adjustment processing on the image content sent from the content server 100, on the basis of the metadata for image quality adjustment sent together with the image content. Thus, it is possible to make the appearance of a display image of image content on the display 600 as a receiver be an appropriate appearance such as an appearance intended by the producer, without particular user operation irrespective of viewing environment changes.

Note that it is conceivable that the reception apparatus of each of the content distribution systems 10A, 10B, 100, and 10D illustrated in FIG. 10, FIG. 11, FIG. 12, and FIG. 13, respectively, includes the set-top box and the display.

7. Modified Example

Note that, although not described above, it is also conceivable that image content sent from the content server or broadcasting station as a transmitter is recorded on a storage medium such as a semiconductor memory or an HDD once, and is then reproduced to provide the display image. In this case, it is sufficient that image quality adjustment processing is performed on the basis of metadata for image quality adjustment generated according to viewing environment information regarding an actual viewing environment. In this case, the metadata is generated by the server or the receiver.

Further, although not described above, it is also conceivable that the metadata generation unit generates, instead of one type of metadata, a plurality of types of metadata to allow the user to select the type of metadata to be actually used.

Further, the preferred embodiments of the present disclosure have been described in detail with reference to the accompanying drawings, but the technical scope of the present disclosure is not limited to the examples. It is obvious that various changes or modifications could be arrived at by persons who have ordinary knowledge in the technical field to which the present disclosure belongs, within the scope of the technical ideas described in the appended claims, and it is therefore understood that such changes or modifications naturally belong to the technical scope of the present disclosure.

Further, the effects described herein are merely illustrative or exemplary and are not limitative. That is, the technology according to the present disclosure may provide other effects that are obvious for persons skilled in the art from the description of the present specification, in addition to or in place of the above-mentioned effects.

Further, the present technology can also take the following configurations.

(1) A reception apparatus including:
a reception unit configured to receive image content; and
a processing unit configured to perform image quality adjustment processing on the received image content on the basis of metadata for image quality adjustment depending on viewing environment information.

(2) The reception apparatus according to (1), in which the reception unit transmits the viewing environment information to a server and receives the metadata from the server.

(3) The reception apparatus according to (2), in which the server includes a server that forms a transmission unit for the image content.

(4) The reception apparatus according to (2), in which the server includes a server provided separately from a transmission unit for the image content.

(5) The reception apparatus according to (4), in which the transmission unit includes a broadcasting station or a server.

(6) The reception apparatus according to (1), further including:
a metadata generation unit configured to generate the metadata on the basis of the viewing environment information.

(7) The reception apparatus according to (6), in which the metadata generation unit generates the metadata by using a metadata generator formed by using a table or a learning result.

(8) The reception apparatus according to (7), in which the reception unit receives the table or the learning result from a transmission unit for the image content or a server provided separately from the transmission unit.

(9) The reception apparatus according to any one of (1) to (8), in which the viewing environment information includes sensing information and/or display information.

(10) The reception apparatus according to any one of (1) to (9), in which the viewing environment information includes at least any of light brightness information, light color information, wall color information, screen size information, and viewing position information.

(11) The reception apparatus according to any one of (1) to (10), further including:
a display configured to display an image of the image content subjected to the image quality adjustment processing by the processing unit.

(12) The reception apparatus according to any one of (1) to (10), further including:
a transmission unit configured to transmit, to a display, the image content subjected to the image quality adjustment processing by the processing unit.

(13) A reception method including:
a procedure of receiving image content; and
a procedure of performing image quality adjustment processing on the received image content on the basis of metadata for image quality adjustment depending on viewing environment information.

(14) A transmission apparatus including:
a reception unit configured to receive viewing environment information; and
a transmission unit configured to transmit image content and metadata for image quality adjustment depending on the viewing environment information.

(15) The transmission apparatus according to (14), in which the viewing environment information includes sensing information and/or display information.

(15) The transmission apparatus according to (14) or (15), in which the viewing environment information includes at least any of light brightness information, light color information, wall color information, screen size information, and viewing position information.

(17) The transmission apparatus according to any one of (14) to (16), in which the metadata is generated on the basis of the viewing environment information by using a metadata generator formed by using a table or a learning result.

(18) A transmission method including:
a procedure of receiving viewing environment information; and
a procedure of transmitting image content and metadata for image quality adjustment depending on the viewing environment information.

REFERENCE SIGNS LIST 10, 10A, 10B, 100, 10D, 10E: Content distribution system
100, 100A: Content server
101: Content holding unit
102: Metadata generation unit
103: Network interface
200, 200A: Reception apparatus
201: Viewing environment information acquisition unit
202: Processing unit
203: Display
204: Network interface
205: Metadata generation unit
206: Reception unit
300: Metadata server
301: Metadata generation unit
302: Network interface
400: Broadcasting station
401: Content holding unit
402: Transmission unit
500: Set-top box
501: Processing unit
502: Network interface
503: Digital interface
600: Display
601: Viewing environment information acquisition unit
602: Digital interface

The invention claimed is:

1. A reception apparatus comprising:
a display;
a network interface;
a sensor unit including a camera; and
circuitry configured to:
receive an image content;
transmit to a server via the network interface, viewing environment information including sensing information generated by the sensor unit;
receive from the server via the network interface, metadata for image quality adjustment in accordance with the viewing environment information; and
perform image quality adjustment processing on the image content on a basis of the metadata for image quality adjustment,
wherein the circuitry is configured to apply the image quality adjustment to an image of the image content to obtain a processed image, and wherein the display is configured to display the processed image.

2. The reception apparatus according to claim 1, wherein the circuitry is configured to receive the image content from a broadcast unit, the server being associated with the broadcast unit.

3. The reception apparatus according to claim 1, wherein the circuitry is configured to receive the image content from a broadcast unit, the server being independent from the broadcast unit.

4. The reception apparatus according to claim 1, wherein the circuitry is configured to generate the metadata on a basis of the viewing environment information.

5. The reception apparatus according to claim 4, wherein the circuitry is configured to generate the metadata from a table or a learning result.

6. The reception apparatus according to claim 5, wherein the circuitry is configured to receive the table or the learning result via the network interface.

7. The reception apparatus according to claim 1, wherein the viewing environment information includes the sensing information and display information.

8. The reception apparatus according to claim 1, wherein the sensing information includes at least one of light brightness information, light color information, or wall color information.

9. The reception apparatus according to claim 1, wherein the network interface is an internet interface.

10. The reception apparatus according to claim 1, wherein the viewing environment information includes at least any of display size information, and viewing position information.

11. The reception apparatus according to claim 1, wherein the sensing information includes at least any of light color information or wall color information.

12. A reception method comprising:
receiving an image content;
transmit to a server via a network interface, viewing environment information including sensing information generated by a sensor unit including a camera;
receiving from the server via the network interface, metadata for image quality adjustment in accordance with the viewing environment information;
performing image quality adjustment processing on the image content on a basis of the metadata for image quality adjustment;
applying the image quality adjustment to an image of the image content to obtain a processed image; and
displaying the processed image by a display of the reception apparatus.

13. The reception method according to claim 12, wherein the network interface is an internet interface.

14. The reception method according to claim 12, wherein the viewing environment information includes the sensing information and display information.

15. The reception method according to claim 12, wherein the viewing environment information includes at least any of light brightness information, light color information, wall color information, display size information, and viewing position information.

16. The reception method according to claim 12, wherein the metadata is generated on a basis of the viewing environment information by using a metadata generator formed by using a table or a learning result.

17. The reception method according to claim 12, wherein the sensing information includes at least one of light brightness information, light color information, or wall color information.

18. The reception method according to claim 12, wherein the viewing environment information includes at least any of light color information, wall color information, display size information, or viewing position information.

* * * * *